United States Patent

Pringle

[15] 3,675,964

[45] July 11, 1972

[54] HIGHWAY TRAILER VEHICLE WITH OFFSET TRUSS STRUCTURE

[72] Inventor: William L. Pringle, Grosse Pointe Shores, Mich.

[73] Assignee: Pullman Incorporated, Chicago, Ill.

[22] Filed: Aug. 21, 1970

[21] Appl. No.: 65,833

[52] U.S. Cl. ................................296/1 A, 105/367, 105/368 R, 248/119 R, 296/3
[51] Int. Cl. ....................................................B60p 3/06
[58] Field of Search..............296/1 A, 3, 10; 280/79.3, 179; 105/367, 368 R; 248/119 R; 211/177

[56] References Cited

UNITED STATES PATENTS

| | | | |
|---|---|---|---|
| 3,182,610 | 5/1965 | Jones | 105/368 R |
| 2,940,402 | 6/1960 | Hansen et al. | 296/3 X |
| 2,725,241 | 11/1955 | Leonard | 280/179 R |
| 2,996,020 | 8/1961 | Udstad | 105/367 |
| 1,788,667 | 1/1931 | Friedlaender | 105/368 R |
| 2,151,431 | 3/1931 | Lord | 105/368 R |
| 2,760,647 | 8/1956 | Saul | 280/79.3 X |
| 3,164,255 | 1/1965 | Jay | 211/177 X |

FOREIGN PATENTS OR APPLICATIONS

| | | | |
|---|---|---|---|
| 806,440 | 9/1936 | France | 296/1 A |
| 346,951 | 7/1922 | Germany | 105/368 R |
| 383,264 | 12/1964 | Switzerland | 105/368 R |

*Primary Examiner*—Benjamin Hersh
*Assistant Examiner*—Leslie J. Paperner
*Attorney*—Hilmond O. Vogel

[57] ABSTRACT

A trailer for connection to a highway tractor comprises a truss structure including relatively narrow, vertical and longitudinally extending beams which are supported on opposite ends of such truss structure on transversely extending stabilizing members. The rear stabilizing member is supported on a suitable wheel and axle assembly and the forward portion of the truss structure is supported on a stabilizing member which includes a downwardly projecting kingpin connected to the fifth wheel of a highway tractor in conventional fashion. The truss structure is the primary structural member extending between the stabilizing members and is offset laterally with respect to the kingpin and longitudinal axis of the tractor to provide an offset space extending the full length of the truss structure within which vehicles or other cargo are suspended by attachment to the beams of the truss structure.

3 Claims, 3 Drawing Figures

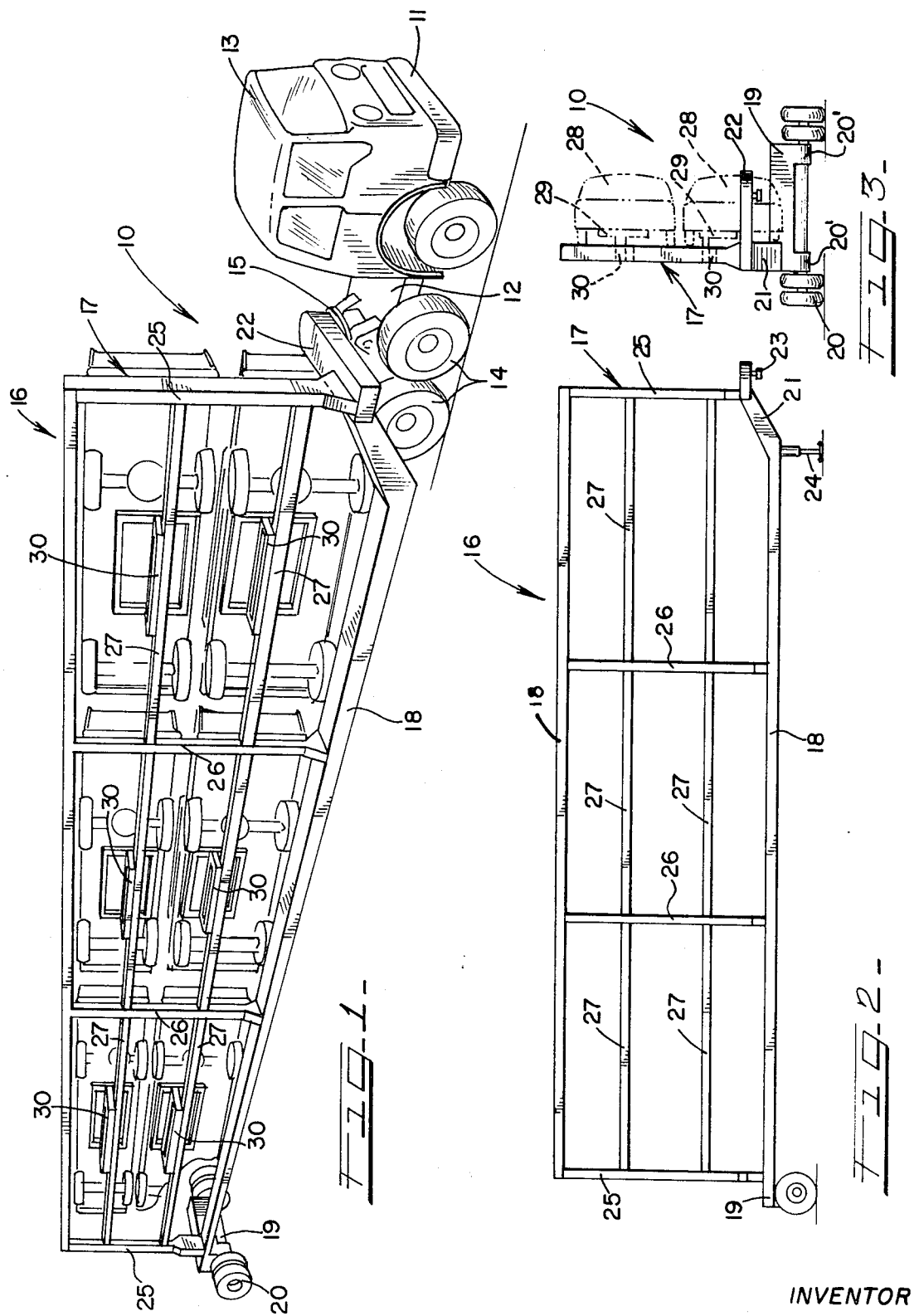
PATENTED JUL 11 1972　　3,675,964
INVENTOR
WILLIAM L. PRINGLE
BY
ATT'Y.

HIGHWAY TRAILER VEHICLE WITH OFFSET TRUSS STRUCTURE

SUMMARY

It is the primary object of the present invention to provide an improved trailer for operation with a highway tractor, said trailer being particularly suitable for carrying vehicles, being of simplified design, and permitting the vehicles to be supported and suspended on one side of the truss in offset relation with respect to a rear wheel assembly and the longitudinal centerline through the highway tractor. The present invention includes a truss frame of somewhat similar construction as that disclosed in applicants' patent application, Ser. No. 65,461 filed Aug. 20, 1970, and further provides with a truss structure, laterally extending stabilizing members which extend laterally outwardly of the truss structure to provide an offset space which is disposed along a vertical plane extending through a kingpin projecting downwardly from one of the stabilizing members and said plane extending substantially parallel with the truss structure the full length thereof. The beams of the truss structure are adapted to have vehicles suspended thereon by means of removable brackets or fixtures which may be connected to the vehicle underframe which thereby support the vehicles free of the wheels of the vehicle directly on the truss with the vehicle sides being disposed substantially parallel to the ground. The simplified arrangement permits quick loading and unloading by suitable crane or other similar devices thereby eliminating the damage to the wheel assemblies which may be occasioned when they are transported over the highway on the usual type of vehicle trailer which has the vehicles positioned thereon on its wheels in normal fashion. The truss structure provides the primary structural member between the highway tractor and the rear wheel assembly connected to the trailer.

BRIEF DESCRIPTION OF THE DRAWINGS

FIG. 1 is a perspective view of a highway tractor and trailer combination showing an improved trailer structure;

FIG. 2 is a side elevational view of the highway trailer shown in FIG. 1; and

FIG. 3 is an end elevational view of the trailer structure shown in FIG. 2.

DETAILED DESCRIPTION

A highway vehicle 10 includes a conventional highway tractor 11 provided with a suitable chassis or body 12 on which an operator's cab 13 is positioned. The body 12 has connected thereto a suitable double-axle wheel suspension 14 and the body 12 supports a conventional type of fifth wheel plate 15 which is not described or disclosed in detail.

A highway trailer is designated at 16 and includes a frame generally designated at 17, the said frame being of a truss type configuration. The frame 17 includes lower and upper longitudinal beams 18 each of which is connected to a rear stabilizing member 19 which extends laterally outwardly with respect to the frame 17. The stabilizing member 19 has connected thereto a suspension or wheel and axle assembly 20 which is suitably connected to the member 19 by downwardly depending pedestals 20', as best shown in FIG. 3. The lower longitudinal member or beam 18 is provided with an upwardly extending neck portion 21 which in turn is connected to a front stabilizing member 22 as best shown in FIG. 1. The front stabilizing member 22 is provided with a downwardly projecting kingpin 23 which is adapted to engage the fifth wheel plate in conventional fashion so as to firmly connect the trailer 16 to the highway tractor 11. A conventional landing gear 24 is also suitably connected to the lower beam 18 for supporting one end of the trailer 16 on the ground when it is detached from the highway tractor 11.

The upper and lower beams 18 are suitably interconnected by means of vertical end members or beams 25 and by means of intermediate beams 26. The beams 18, 25 and 26 are of relatively narrow construction so that the frame is relatively narrow, but of substantial height, to provide a wide area for support of cargo thereon. The frame further includes intermediate longitudinally extending beams 27 in turn also connected to the beams 25 and 26. As best shown in FIG. 3, the truss frame 17 is particularly adapted to support automobiles or vehicles 28 by means of suitable fixtures or brackets 29 which are adapted to be connected to the conventional underframe of the automobiles. Hanger brackets 30 are suitably connected or suspended on the horizontal beams 27 and such a construction is particularly well disclosed in applicants' copending patent application Ser. No. 65,831 filed Aug. 21, 1970.

It can be seen from the FIGS. that the truss structure 17 is offset horizontally with respect to a vertical plane extending through the kingpin 23 and said frame 17 extends substantially parallel to such a vertical plane. Thus an offset space is provided on one side of the truss structure 17 and in which space the said vehicles are positioned, as best shown in FIG. 3, and are removably supported on the truss structure in suspended fashion without the wheels of the vehicles providing support for said vehicles during shipment. The advantages of such a support have been indicated above and include the fact that over long distance shipment, the bearings of the wheels are not detrimentally affected as is the case in a conventional shipment of automobiles on the conventional auto trailer. Further, the loading may be by a suitable crane, as shown in the last above mentioned patent application, in a simple and quick manner, thus eliminating the need of an operator driving the vehicles onto the trailer structure.

Thus it is believed that an improved trailer structure has been disclosed which fully accomplishes the stated objects of the invention.

What is claimed is:

1. A vehicle comprising:
   an upright narrow width frame including upper and lower longitudinally extending beams,
   vertical end and intermediate beams connecting said longitudinal beam and being in general longitudinal alignment therewith to provide a high truss structure of relatively narrow width.
   said frame providing the primary structural support of the vehicle,
   stabilizing means provided at longitudinally opposite ends of said frame including a forward structural horizontal member projecting laterally relative to said frame,
   a second rearward structural horizontal member projecting laterally in the same direction as said first horizontal member,
   a kingpin on said first horizontal member adapted to connect to the fifth wheel of a highway tractor,
   a wheel and axle assembly connected to said second horizontal member,
   the longitudinal axis of said frame being parallel to and offset laterally with respect to a vertical plane through said kingpin with said upright frame and forward member forming an L-shaped configuration in transverse section and said upright frame and said rearward member forming an L-shaped configuration in transverse section and defining an open cargo space extending generally the length and width of the vehicle,
   bracket means for suspending cargo on said frame.

2. The invention according to claim 1, and said forward member being spaced vertically upward from said rearward member.

3. The invention according to claim 1, and said lower beam having a forward upwardly and outwardly diagonally extending portion connecting with said forward member.

* * * * *